(12) United States Patent
Hwang et al.

(10) Patent No.: US 12,063,428 B2
(45) Date of Patent: Aug. 13, 2024

(54) CAMERA MODULE

(71) Applicant: SAMSUNG ELECTRO-MECHANICS CO., LTD., Suwon-si (KR)

(72) Inventors: Se Yeon Hwang, Suwon-si (KR); Yeo Ok Jeon, Suwon-si (KR); Seok Hwan Kim, Suwon-si (KR); Seung Jae Song, Suwon-si (KR); Han Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 124 days.

(21) Appl. No.: 17/989,832

(22) Filed: Nov. 18, 2022

(65) Prior Publication Data

US 2023/0209161 A1   Jun. 29, 2023

(30) Foreign Application Priority Data

Dec. 27, 2021   (KR) .......................... 10-2021-0188596

(51) Int. Cl.
*H04N 23/54* (2023.01)
*H04M 1/02* (2006.01)

(52) U.S. Cl.
CPC .......... *H04N 23/54* (2023.01); *H04M 1/0264* (2013.01); *H04M 2250/52* (2013.01)

(58) Field of Classification Search
CPC ........ H04N 23/54; H04N 23/57; H04N 23/55; H04M 1/0264; H04M 2250/52;

(Continued)

(56) References Cited

U.S. PATENT DOCUMENTS

| 7,997,812 B2 * | 8/2011 | Kim | H04N 23/54 |
| | | | 348/340 |
| 8,253,839 B2 * | 8/2012 | Chang | G02B 7/021 |
| | | | 348/335 |

(Continued)

FOREIGN PATENT DOCUMENTS

| CN | 110456592 A | 11/2019 |
| KR | 10-2008-0092492 A | 10/2008 |

(Continued)

OTHER PUBLICATIONS

Korean Office Action issued on Nov. 24, 2023, in counterpart Korean Patent Application No. 10-2021-0188596 (5 pages in English, 4 pages in Korean).

*Primary Examiner* — Padma Haliyur

(74) *Attorney, Agent, or Firm* — NSIP Law

(57) ABSTRACT

A camera module is provided. The camera module includes a lens barrel in which at least one lens is installed; and a lens holder to which the lens barrel is fixedly installed, wherein one of the lens holder and the lens barrel is provided with a coupling protrusion, and the other thereof is provided with a coupling groove into which the coupling protrusion is inserted, the lens holder is provided with a support portion that supports one end portion of the lens barrel, wherein the one end portion of the lens barrel is disposed between the coupling protrusion and the support portion, and the support portion of the lens holder elastically supports the lens barrel in an optical axis direction.

15 Claims, 6 Drawing Sheets

(58) Field of Classification Search
CPC .... G02B 7/021; G02B 7/026; G02B 13/0065;
G03B 5/00; G03B 13/36; G03B 17/17;
G03B 30/00; G03B 17/12
See application file for complete search history.

(56) References Cited

U.S. PATENT DOCUMENTS

| | | | | |
|---|---|---|---|---|
| 8,305,482 | B2* | 11/2012 | Yen | G02B 7/023 |
| | | | | 348/208.2 |
| 8,773,572 | B2* | 7/2014 | Chang | H04N 23/55 |
| | | | | 348/340 |
| 11,867,967 | B2* | 1/2024 | Kim | G02B 9/60 |
| 2012/0281297 | A1* | 11/2012 | Ohno | H04N 23/69 |
| | | | | 359/823 |
| 2015/0015954 | A1* | 1/2015 | Baik | G02B 27/0006 |
| | | | | 359/507 |
| 2015/0296110 | A1 | 10/2015 | Lee et al. | |
| 2016/0377827 | A1* | 12/2016 | Kang | H04N 23/51 |
| | | | | 359/784 |
| 2018/0367714 | A1* | 12/2018 | Im | H04N 23/687 |
| 2019/0137724 | A1* | 5/2019 | Kim | G02B 7/02 |
| 2020/0218082 | A1 | 7/2020 | Choi et al. | |

FOREIGN PATENT DOCUMENTS

| | | |
|---|---|---|
| KR | 10-2014-0060471 A | 5/2014 |
| KR | 10-2016-0028704 A | 3/2016 |
| KR | 10-2047378 B1 | 11/2019 |
| KR | 10-2020-0086482 A | 7/2020 |

* cited by examiner

CAMERA MODULE

CROSS-REFERENCE TO RELATED APPLICATIONS

This application claims the benefit under 35 USC § 119(a) of Korean Patent Application No. 10-2021-0188596 filed on Dec. 27, 2021, in the Korean Intellectual Property Office, the entire disclosure of which is incorporated herein by reference for all purposes.

BACKGROUND

1. Field

The following description relates to a camera module.

2. Description of Related Art

A camera module is a miniature camera mounted on devices, such as, but not limited to, mobile phones, laptops, webcams, or the like. Although the picture quality may be inferior compared to the picture quality of digital single-lens reflex (DSLR) cameras, such a camera module has gained popularity due to the advantage of allowing a user to instantaneously take pictures anywhere. Currently, the majority of mobile phones have built-in cameras. Additionally, the picture quality of mobile phone cameras has been continuously improved. Accordingly, a structure of the camera module is also complicated.

Recently, in order to solve this problem, a camera module having a plurality of lenses disposed in a longitudinal direction or a width direction, rather than a thickness direction of the portable electronic device, and a reflection member that changes a path of light has been proposed.

However, in the camera module having the above-described structure, there may be a problem, in that a lens barrel in which a lens is installed and a holder into which the lens barrel is inserted may be bonded by a bonding agent, so that there may be a problem in that they may be easily separated due to a drop impact or vibrations.

Furthermore, by bonding the lens barrel and the holder by a bonding agent, there may be a problem in that the manufacturing costs may increase due to the time required for the bonding process and the input device.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a lens barrel in which at least one lens is installed; and a lens holder to which the lens barrel is fixedly installed, wherein one of the lens holder and the lens barrel is provided with a coupling protrusion and the other thereof is provided with a coupling groove into which the coupling protrusion is inserted, wherein the lens holder is provided with a support portion that supports one end portion of the lens barrel, wherein the one end portion of the lens barrel is disposed between the coupling protrusion and the support portion, and wherein the support portion of the lens holder elastically supports the lens barrel in an optical axis direction.

The coupling groove may be formed to have a band shape on an external surface of the one end portion of the lens barrel, and wherein the plurality of coupling protrusions are disposed on an internal surface of the lens holder to be spaced apart from each other to be inserted into the coupling groove.

The coupling protrusion may be configured to have an external surface with a curved shape.

The coupling groove may have a V-shaped cross-section.

The support portion may include an extension bar that extends obliquely from an internal surface of the lens holder, and a contact bar in contact with an end of the lens barrel, and extending from the extension bar.

The contact bar may be configured to be in contact with a side of an edge of an end surface of the lens barrel.

An upper surface and a bottom surface of the lens barrel may be provided with a planar portion having a planar shape and an arc portion that connects both end portions of the planar portion, and the contact bar may be in contact with the end surface of the lens barrel so as to be disposed adjacent to a portion of the lens barrel to which the planar portion and the arc portion are connected.

An internal surface of the lens holder may have an arc portion which corresponds to a shape of the external surface of the lens barrel.

The coupling protrusion may be formed to protrude from the arc portion of the lens holder.

Two of the coupling protrusions may be disposed to be spaced apart from each other on each of opposite arc portions of the lens holder.

The support portion may be formed to extend from the arc portion of the lens holder.

In a general aspect, an apparatus includes a camera module, including a housing; a reflection module, configured to change a direction of light incident to the housing; a lens barrel, comprising a plurality of coupling grooves; a lens holder, comprising a plurality of protrusions disposed on an internal surface of the lens holder, the plurality of protrusions configured to be respectively fixed into the plurality of coupling grooves; and a support portion, comprising an extension bar that extends from an internal surface of the lens holder, and a contact bar, that extends from the extension bar, and is configured to elastically support the lens barrel.

A shape of the coupling groove may correspond to a shape of the protrusions.

The reflection module may be disposed on a front side of the lens barrel.

The reflection module includes at least one of a mirror and a prism.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
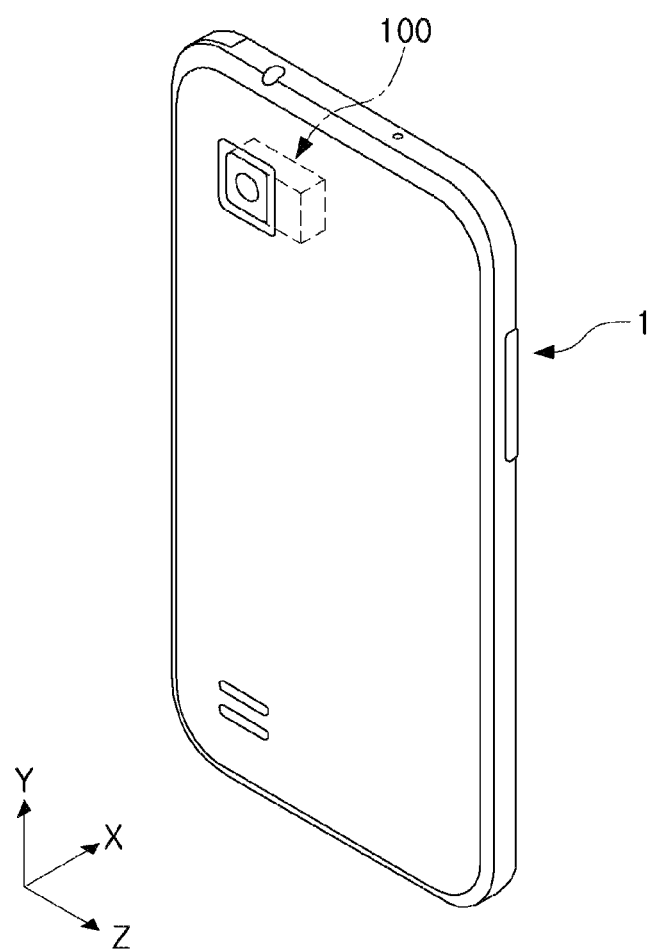
FIG. 1 illustrates a perspective view of an example portable electronic device equipped with a camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples provide a camera module that reduces the separation of a lens barrel and a holder, and reduces manufacturing costs.

FIG. 1 illustrates a perspective view of an example portable electronic device on which a camera module, in accordance with one or more embodiments, is mounted.

Referring to FIG. 1, a camera module 100, in accordance with one or more embodiments, may be mounted on a portable electronic device 1. The portable electronic device 1 may be, as only examples, a portable electronic device such as a mobile communication terminal, a smartphone, a tablet personal computer (PC), or the like.

As illustrated in FIG. 1, the camera module 100 is mounted on the portable electronic device 1 to capture an image of a subject.

In the one or more examples, the camera module 100 includes a plurality of lenses. Optical axes of the plurality of lenses (Z-axis) may face a direction, perpendicular to a thickness direction (X-axis direction, a direction, from a front surface toward a rear surface of the portable electronic device or an opposite direction thereto.

For example, the optical axes (Z-axis) of the plurality of lenses provided in the camera module 100 may be formed in a width direction or a length direction of the portable electronic device 1.

Therefore, even if the camera module 100 has functions such as auto focusing (hereinafter, referred to as AF), optical zoom (hereinafter, referred to as "zoom"), and optical image stabilizing (hereinafter, referred to as OIS), the camera module 100 may prevent a thickness of the portable electronic device 1 from increasing. Accordingly, it is possible to reduce the thickness of the portable electronic device 1.

The camera module 100, in accordance with one or more embodiments, may include at least one of AF, Zoom, OIS functions, and the like.

Since the camera module 100 which has the AF, Zoom, OIS functions, and the like, must be provided with various parts, a size of the camera module increases as compared to a typical camera module.

When the size of the camera module 100 increases, it may be difficult to reduce the thickness of the portable electronic device 1 on which the camera module 100 is mounted.

For example, the camera module may include a plurality of lens groups to implement a zoom function. When the plurality of lens groups are disposed in a thickness direction of the portable electronic device, the thickness of the portable electronic device increases based on the number of lens groups. Accordingly, if the thickness of the portable electronic device is not increased, the number of lens groups cannot be sufficiently secured, and the zoom performance may be weakened.

Additionally, in order to implement the AF, Zoom, OIS functions, and the like, an actuator that moves the plurality of lens groups in a direction of an optical axis or in a direction, perpendicular to the optical axis, or the like, should be installed. When the optical axes (Z-axis) of the lens groups are formed in a thickness direction of the portable electronic device, an actuator that moves the lens group should also be installed in a thickness direction of the portable electronic device. Accordingly, the thickness of the portable electronic device is increased.

However, in the camera module 100, in accordance with one or more embodiments, since the optical axes (Z-axis) of the plurality of lenses are disposed to be perpendicular to the thickness direction (X-axis direction) of the portable electronic device 1, even when the camera module 100 having the AF, Zoom, OIS functions, and the like, is mounted thereon, the thickness of the portable electronic device 1 may be reduced.

Figure 2:
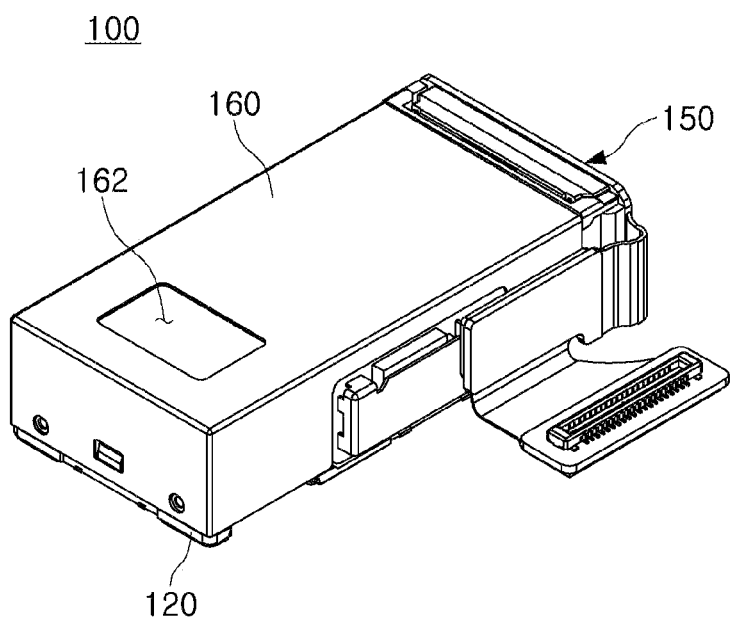
FIG. 2 illustrates a schematic perspective view of an example camera module, in accordance with one or more embodiments.
Figure 3:
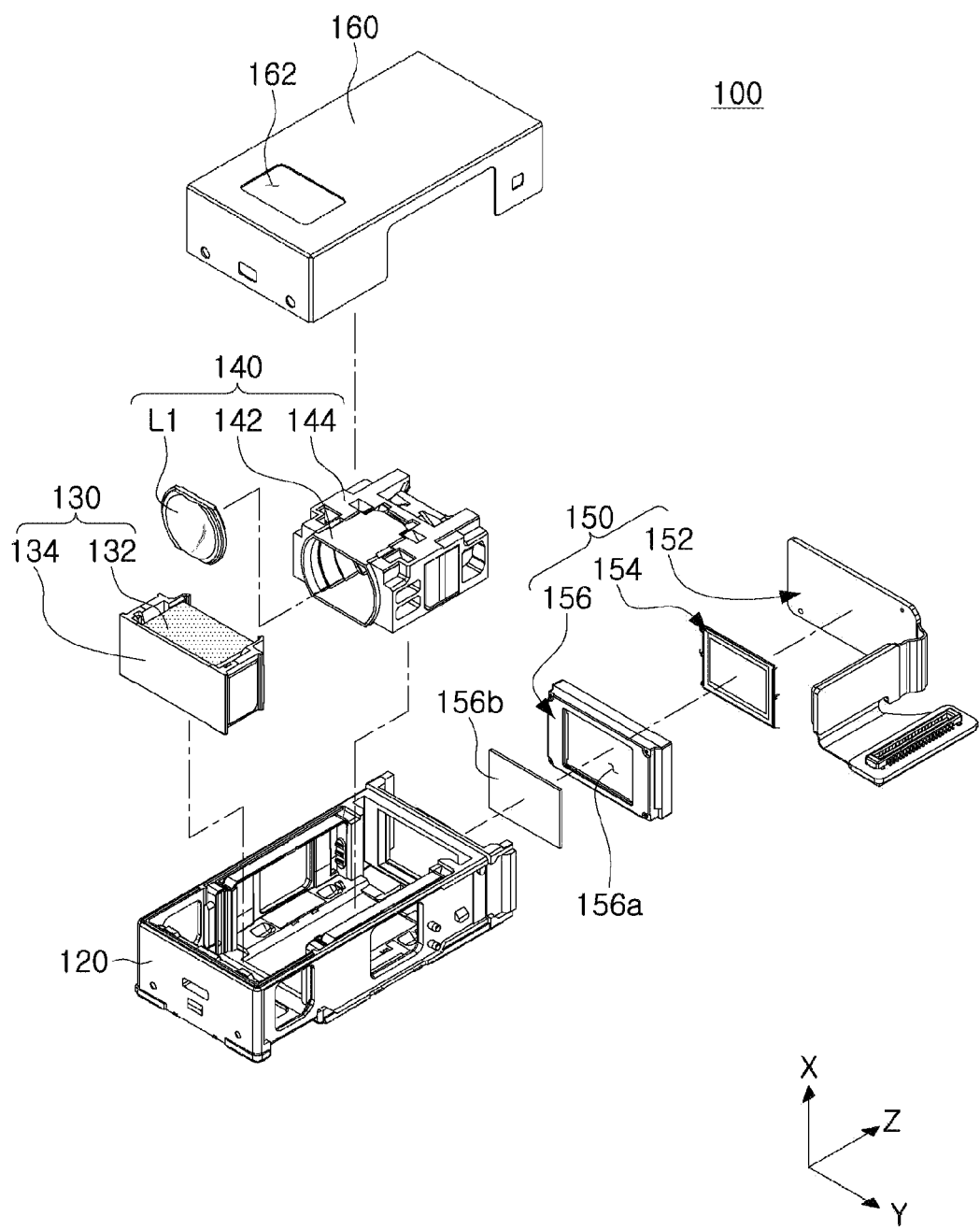
FIG. 3 illustrates a schematic exploded perspective view of an example camera module, in accordance with one or more embodiments.

FIG. 2 illustrates a schematic perspective view of an example camera module, in accordance with one or more embodiments, and FIG. 3 illustrates a schematic exploded perspective view of the example camera module, in accordance with one or more embodiments.

Referring to FIGS. 2 and 3, an example camera module 100 includes a housing 120, a reflection module 130, a lens module 140, an image sensor module 150, and a case or cover 160.

The reflection module 130, the lens module 140, and the image sensor module 150 are disposed inside the housing 120 from a first side toward a second side thereof. The housing 120 has an internal space to accommodate the reflection module 130, the lens module 140, and the image sensor module 150. However, in an example, the image sensor module 150 may be attached to the outside of the housing 120.

In FIGS. 2 and 3, an embodiment in which the reflection module 130, the lens module 140, and the image sensor module 150 are disposed inside the housing 120 is illustrated. However, unlike the embodiments of FIGS. 2 and 3, in an example, the reflection module 130 may be disposed outside the housing 120, and in this example, a first side of the housing 120 may be open so that the light transmitted from the reflection module 130 passes therethrough.

The housing 120 may have a box shape with an open upper portion.

The case or cover 160 is coupled to the housing 120 so as to cover the upper portion of the housing 120. The case 160 has an opening 162 through which light is incident. A travelling direction of the light incident through the opening 162 of the case 160 is changed by the reflection module 130 and is incident on the lens module 140.

The reflection module 130 is configured to change the travelling direction of light. For example, the traveling direction of the light incident into the housing 120 may be changed toward the lens module 140 through the reflection module 130. The reflection module 130 is disposed on a front side of the lens module 140.

The reflection module 130 includes a reflection member 132 and a holder 134 on which the reflection member 132 is mounted.

The reflection member 132 is configured to change the traveling direction of light. For example, the reflection member 132 may be a mirror or a prism that reflects light.

The lens module 140 includes a plurality of lenses through which the light of which traveling direction is changed by the reflection member 132 passes, a lens barrel 142 that accommodates the plurality of lenses, and a lens holder 144 in which the lens barrel 142 is accommodated. In an example, a detailed description of the lens barrel 142 and the lens holder 144 will be described later.

For convenience of explanation, only a lens L1 (hereinafter, referred to as a first lens) disposed closest to a side of an object (an object-side), among the plurality of lenses, is illustrated in FIG. 3.

The image sensor module 150 is disposed on a rear side of the lens module 140, and the light passing through the lens module 140 is received by the image sensor module 150. In an example, the image sensor module 150 may include a substrate 152, an image sensor 154 mounted on the substrate 152, and a sub-housing 156 having an opening 156a formed therein.

An infrared cut-off filter 156b may be mounted on the sub-housing 156, and the infrared cut-off filter 156b may block light in an infrared region among the light passing through the lens module 140.

Figure 4:
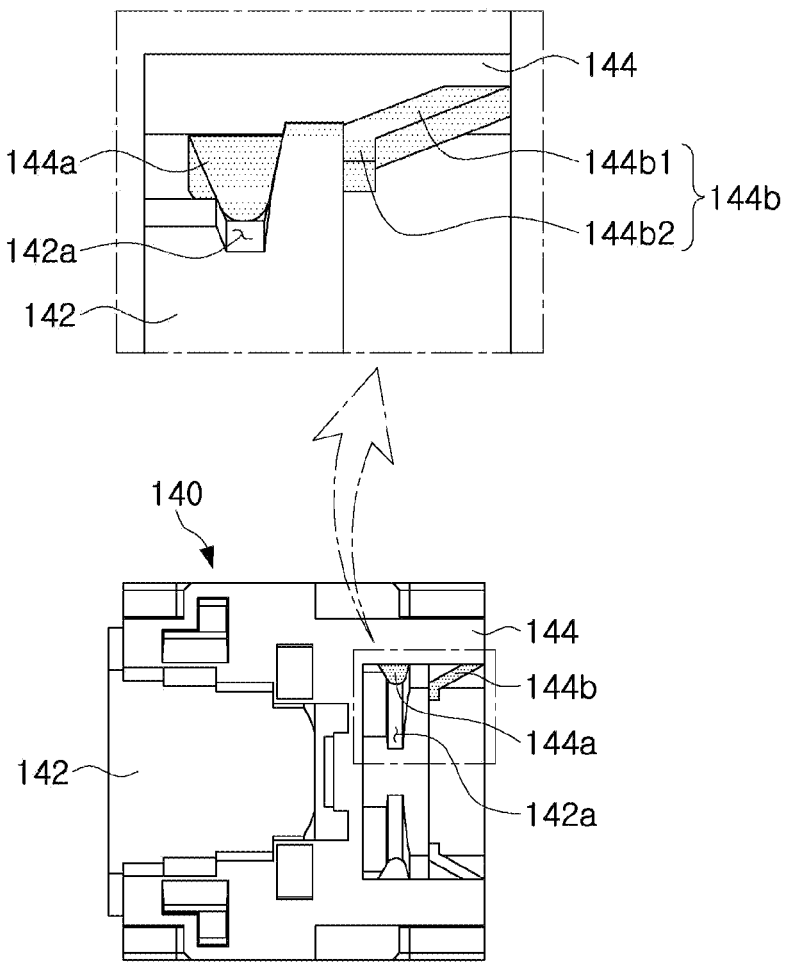
FIG. 4 is a plan view illustrating a lens barrel and a lens holder.
Figure 5:
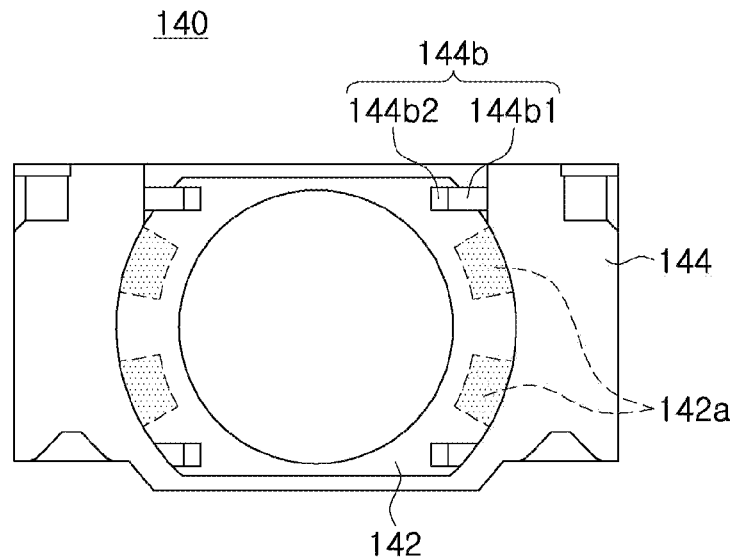
FIG. 5 is a side view illustrating a lens barrel and a lens holder.
Figure 6:
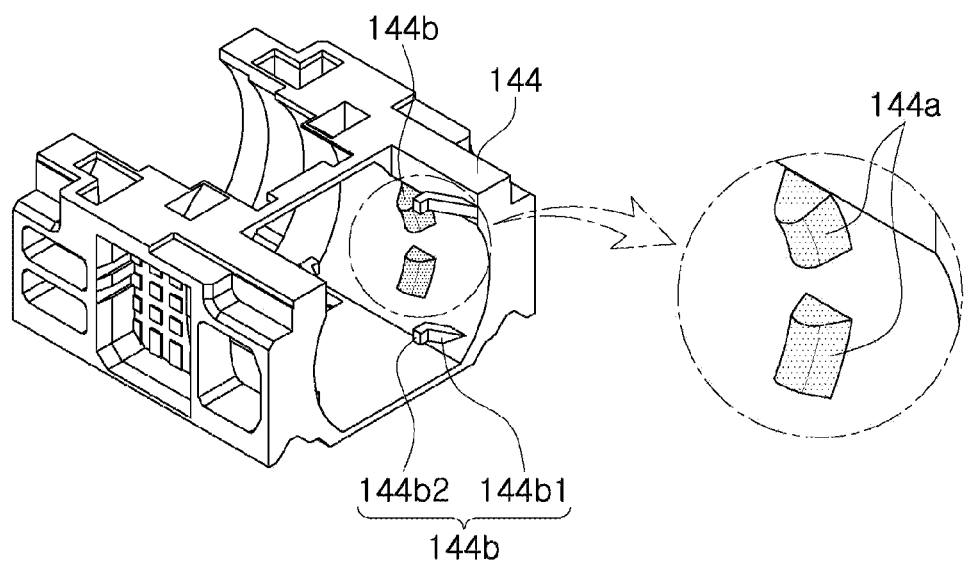
FIG. 6 is a side view illustrating a lens holder.
Figure 7:
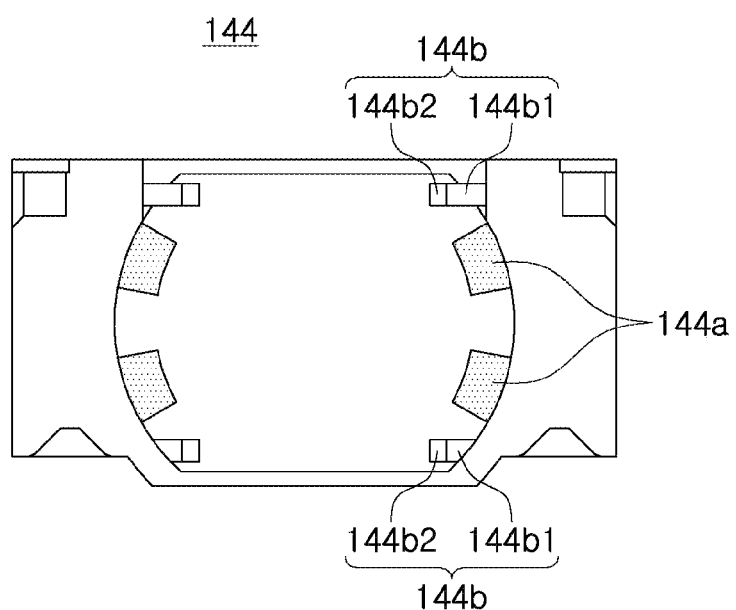
FIG. 7 is a perspective view illustrating a lens holder.

FIG. 4 is a plan view illustrating a lens barrel and a lens holder, FIG. 5 is a side view illustrating a lens barrel and a lens holder, FIG. 6 is a side view illustrating a lens holder, and FIG. 7 is a perspective view illustrating a lens holder.

Referring to FIGS. 4 to 7, a lens barrel 142 has an internal space in which at least one lens is installed. In an example, an upper surface and a bottom surface of the lens barrel 142 may be formed of a planar portion having a planar shape, and a side surface of the lens barrel 142 may be formed of an arc portion having an arc shape. A coupling groove 142a may be provided on an external surface of one end portion of the lens barrel 142. The coupling groove 142a may have a band shape, and the coupling groove 142a may be disposed on an arc portion having an arc shape, among external surfaces of the lens barrel 142. The coupling groove 142a may have a 'V' or 'U' shape in cross-section.

The lens barrel 142 is fixedly installed to the lens holder 144. In an example, a coupling protrusion 144a coupled to the coupling groove 142a may be provided on an external surface of the lens holder 144. The coupling protrusion 144a is a configuration provided in the lens holder 144 to fix the lens barrel 142 to the lens holder 144, and the coupling protrusion 144a may have a shape corresponding to the coupling groove 142a. In an example, the coupling protrusion 144a may be provided on an internal surface having an arc shape, among internal surfaces of the lens holder 144. For example, a plurality of coupling protrusions 144a may be disposed on the internal surface of the lens holder 144 to be spaced apart from each other. In an example, a total of four coupling protrusions 144a may be provided in an arc portion, an internal surface having an arc shape of the lens holder 144. However, this is only an example, and the number of coupling protrusions 144a may be less than or greater than four.

In an example, the coupling protrusion 144a may have a curved external surface. Accordingly, when the lens barrel 142 is inserted and coupled to the lens holder 144 by force fitting, one end portion of the lens barrel 142 may pass through the coupling protrusion 144a more smoothly. Furthermore, since the coupling protrusion 144a has a curved external surface, the coupling protrusion 144a may be more smoothly inserted into a coupling groove 142a. The coupling protrusion 144a may be elastically deformed during assembly of the lens barrel 142, and then inserted and mounted in the coupling groove 142a.

The lens holder 144 may have a support portion 144b that supports one end portion of the lens barrel 142, and one end portion of the lens barrel 142 may be disposed between the coupling protrusion 144a and the support portion 144b. The support portion 144b of the lens holder 144 elastically supports the lens barrel 142 in an optical axis direction.

In an example, the support portion 144b may include an extension bar 144b1 extending obliquely from an arc portion, among the internal surfaces of the lens holder 144, and a contact bar 144b2 in contact with an end of the lens barrel 142, and extending from the extension bar 144b1.

The contact bar 144b2 may be in contact with an edge of an end surface of the lens barrel 142. In other words, the contact bar 144b2 may be in contact with the end surface of the lens barrel 142 to be disposed adjacent to a portion to which a straight portion and an arc portion of the lens barrel 142 are connected.

Accordingly, the lens barrel 142 may be supported through the support portion 144b of the lens holder 144 to prevent the lens barrel 142 from escaping from, or being discharged from, the lens holder 144.

As described above, since the lens barrel 142 and the lens holder 144 may be fixed based on the coupling protrusion 144a and the support portion 144b, there is no need to assemble the lens barrel 142 and the lens holder 144 by a bonding process. Accordingly, the manufacturing process may be simplified, and the management process may be shortened, thereby improving manufacturing efficiency.

Additionally, the coupling protrusion 144a of the lens holder 144 may be inserted into the coupling groove 142a of the lens barrel 142 so that the lens holder 144 and the lens barrel 142 are coupled, thereby increasing coupling force. Additionally, since the lens barrel 142 is elastically supported through the support portion 144b2 of the lens holder 144, the coupling force between the lens holder 144 and the lens barrel 142 may be increased.

Furthermore, since a bond may not be applied for a bonding process, it is possible to reduce the manufacturing costs.

As set forth above, in accordance with the one or more examples, separation of a lens barrel and a holder can be reduced, and manufacturing costs can be reduced.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens barrel in which at least one lens is installed; and
   a lens holder to which the lens barrel is fixedly installed,
   wherein one of the lens holder and the lens barrel is provided with a coupling protrusion and the other thereof is provided with a coupling groove into which the coupling protrusion is inserted,
   wherein the lens holder is provided with a support portion that supports one end portion of the lens barrel, wherein the one end portion of the lens barrel is disposed between the coupling protrusion and the support portion, and
   wherein the support portion of the lens holder elastically supports the lens barrel in an optical axis direction.

2. The camera module of claim 1, wherein the coupling groove is formed to have a band shape on an external surface of the one end portion of the lens barrel, and
   wherein the plurality of coupling protrusions are disposed on an internal surface of the lens holder to be spaced apart from each other to be inserted into the coupling groove.

3. The camera module of claim 2, wherein the coupling protrusion is configured to have an external surface with a curved shape.

4. The camera module of claim 3, wherein the coupling groove has a V-shaped cross-section.

5. The camera module of claim 1, wherein the support portion comprises an extension bar that extends obliquely from an internal surface of the lens holder, and a contact bar in contact with an end of the lens barrel, and extending from the extension bar.

6. The camera module of claim 5, wherein the contact bar is configured to be in contact with a side of an edge of an end surface of the lens barrel.

7. The camera module of claim 6, wherein an upper surface and a bottom surface of the lens barrel are provided with a planar portion having a planar shape and an arc portion that connects both end portions of the planar portion, and
   wherein the contact bar is in contact with the end surface of the lens barrel so as to be disposed adjacent to a portion of the lens barrel to which the planar portion and the arc portion are connected.

8. The camera module of claim 1, wherein an internal surface of the lens holder has an arc portion which corresponds to a shape of the external surface of the lens barrel.

9. The camera module of claim 8, wherein the coupling protrusion is formed to protrude from the arc portion of the lens holder.

10. The camera module of claim 9, wherein two of the coupling protrusions are disposed to be spaced apart from each other on each of opposite arc portions of the lens holder.

11. The camera module of claim 8, wherein the support portion is formed to extend from the arc portion of the lens holder.

12. An apparatus, comprising:
    a camera module, comprising:
      a housing;
      a reflection module, configured to change a direction of light incident to the housing;
      a lens barrel, comprising a plurality of coupling grooves;
      a lens holder, comprising a plurality of protrusions disposed on an internal surface of the lens holder, the plurality of protrusions configured to be respectively fixed into the plurality of coupling grooves; and
      a support portion, comprising an extension bar that extends from an internal surface of the lens holder, and a contact bar, that extends from the extension bar, and is configured to elastically support the lens barrel.

13. The apparatus of claim 12, wherein a shape of each of the coupling grooves corresponds to a shape of each of the protrusions.

14. The apparatus of claim 12, wherein the reflection module is disposed on a front side of the lens barrel.

15. The apparatus of claim 12, wherein the reflection module includes at least one of a mirror and a prism.

* * * * *